3,845,144
CONTINUOUS PRODUCTION OF PROPYLENE CHLOROHYDRIN

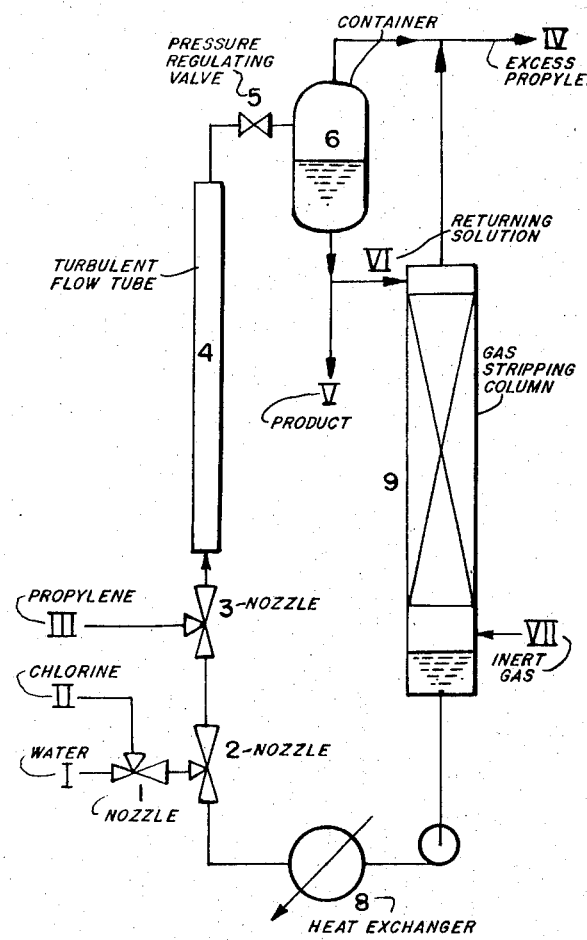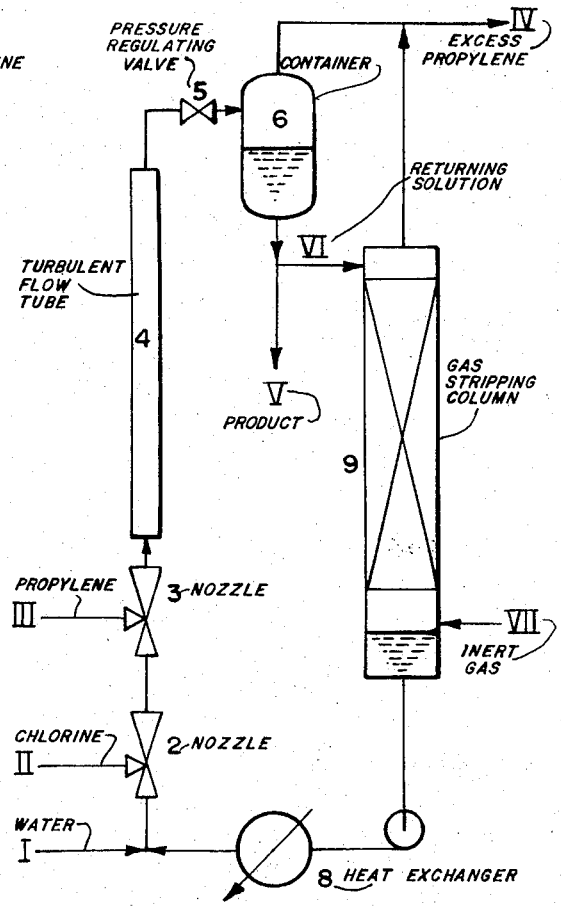
INVENTORS:
ERNST BARTHOLOME
WALDEMAR KOEHLER
GUENTER STOECKELMANN
GERHARD SCHULZ
OTTO NAGEL
WALTER GOETZE
WERNER KASPER
ERICH DREHER
ROLAND DAHLINGER

Ernst Bartholome, Heidelberg, Waldemar Koehler, Ludwigshafen, Guenter Stoeckelmann, Bobenheim-Roxheim, Gerhard Schulz, Ludwigshafen, Otto Nagel, Hambach, Walter Goetze, Ludwigshafen, Werner Kasper, Frankenthal, Erich Dreher, Ludwigshafen, and Roland Dahlinger, Neckargemuend, Germany, assignors to Badische Anilin- & Soda-Fabrik Aktiengesellschaft, Ludwigshafen (Rhine), Germany
Filed Mar. 31, 1971, Ser. No. 130,000
Int. Cl. C07c *31/34*
U.S. Cl. 260—634         10 Claims

ABSTRACT OF THE DISCLOSURE

Production of propylene chlorohydrin by feeding propylene to a recycled reaction solution loaded with chlorine, reacting the propylene with the chlorine in tubes in which there is turbulent flow and with a residence time of not more than ten seconds, releasing the pressure, removing some of the propylene chlorohydrin solution as product and recycling the remainder, both the chlorine and the propylene being added through nozzles in mixing chambers at a flow velocity of 2 to 100 m./second.

---

The invention relates to a process for the continuous production of an aqueous solution of propylene chlorohydrin in which addition of chlorine to the fresh water and/or the recycled propylene chlorohydrin solution and the addition of propylene to the solution loaded with chlorine take place with intense mixing. High space-time yields and better yields are obtained in this way.

Propylene chlorohydrin, which is required in particular for the production of propylene oxide, is formed conventionally by reaction of propylene with hypochlorous acid; for this purpose, an aqueous solution of chlorine is used in which hypochlorous acid is present in a definite equilibrium concentration.

Undesired side reactions, particularly the addition of chlorine to propylene with the formation of 1,2-dichloropropane and the formation of chlorinated ethers, epichlorohydrin and chloroacetone, take place in the production of propylene chlorohydrin. The formation of these byproducts may rest in the separation of a second organic phase.

It is known that the addition of chlorine to dichloropropane proceeds preferentially in the gas phase and in a non-aqueous medium, for example in the separating dichloropropane itself.

Therefore in the disclosure of U.K. Pat. No. 1,024,819 numerous proposals are made for restraining the formation of byproducts. Thus it is recommended to add only such an amount of chlorine that (a) it is completely dissolved and (b) the formation of an organic phase is avoided or the organic phase is removed by separation. Accordingly the organic phase should be finely dispersed or it should be removed by separation with hydrocyclones. Although this improvement and also the use of a number of successive mixing cycles results in an increase in the yield, the space-time yields remain inadequate. Moreover it is only possible therewith to prepare up to about 5% by propylene chlorohydrin solution because in attempts to obtain solutions containing a higher percentage of propylene chlorohydrin by the conventional methods the formation of byproducts is promoted and the yield is thereby decreased.

It is an object of this invention to provide a process suitable for the continuous industrial production of propylene chlorohydrin solutions containing a high percentage of chlorohydrin and which achieves not only high yields but also high space-time yields.

This object is achieved in accordance with the invention in the reaction of propylene with an aqueous solution of chlorine and recycling some of the reaction solution (with or without the separation of byproducts) by loading the makeup water or the recycled reaction solution or a mixture of makeup water and recycled reaction solution rapidly with gaseous and/or liquid chlorine in such an amount that the solubility limit of the replenished recycle solution is not exceeded, metering the propylene to be reacted at a pressure of from 2 to 20 atmospheres, preferably from 4 to 10 atmospheres, absolute and at a temperature of from 10° to 80° C., mainly at 20° to 50° C., into the chlorine-laden solution, allowing the mixture to react in one or more parallel tubes with turbulent flow in the same pressure range with a residence time of not more than ten seconds, releasing the pressure, withdrawing some of the propylene chlorohydrin solution as product solution and recycling the remainder of the propylene chlorohydrin solution, wherein after the addition of the chlorine and propylene the liquid reaction mixture is introduced at a velocity of from 2 to 100 meters per second, preferably from 10 to 30 meters per second, through one or more nozzles into a mixing zone extending in the direction of flow whose diameter is from 1.5 to 50 times the mean outlet diameter of the liquid nozzles and whose length is from 3 to 30 times its hydraulic diameter.

The hydraulic diameter according to H. Schlichting, Grenzschicht-Theorie, Karlsruhe, 1965, page 568, is defined by:

$$d_H = 4\frac{F}{U}$$

where

F is the flow cross-section and
U is the wetted circumference of the pipe.

Accordingly the intense and rapid mixing during the dissolution of the chlorine and particularly during the addition of the propylene is of special importance for the achievement of the advantages of the process. In accordance with the process of the invention mixing between the reactants takes place (in contrast to prior art methods) by turbulent jet mixing, the mixing energy being introduced mainly by the jets of liquid.

The nozzles may be two-fluid nozzles, particularly liquid jet nozzles in which the gas component to be admixed is introduced in the shear gradient between the rapidly flowing jet and a more slowly flowing portion of the liquid and downstream of which an impulse exchange tube is provided.

In supplying the necessary mixing energy by nozzles, the energy to be introduced by the jet of liquid may also be characterized by the throughput of liquid and the pressure drop due to acceleration of the liquid. The latter is advantageously at least 0.3 atmospheres absolute, preferably from 0.5 to 2 atmospheres absolute.

The reaction of the dissolved chlorine with the propylene (which is preferably added in the stoichiometric amount or in a slight excess over the stoichiometric amount) takes place in the mixing zone and the reaction zone downstream of the same in conventional pressure and temperature ranges. For example a pressure range of from 2 to 20, preferably from 4 to 10, atmospheres absolute and a temperature range of from 10° to 80° C., preferably from 20° to 50 C., may be used.

The procedure to be followed in the process of the invention may be that the recycled propylene chlorohydrin solution, which as a rule has a chlorohydrin concentration from 3 to 10% by weight, and that makeup water, alone or after mixing with chlorine, preferably liquid chlorine, are mixed, at temperatures of from 10° to 80° C., preferably of from 20° to 50° C., using mixing means which produce the necessary minimum mixing effect. The amount of chlorine is measured so that the solubility limit is not exceeded under the chosen temperature and pressure conditions. It may be easily calculated or determined by preliminary experiment in individual cases. Since the highest possible concentration of dissolved chlorine is desired in the subsequent propylene reaction, but the rapid production of saturated or substantially saturated chlorine solution is difficult on an industrial scale, the concentration of dissolved chlorine is advantageously kept somewhat below the saturation limit, preferably at 80% of the saturation limit. The process may be carried out at lower concentrations down to 30% of the saturation concentration, but the space-time yield is then markedly decreased as compared with the preferred embodiment.

After the chlorine has dissolved completely (for which from one to ten seconds, as a rule only 1 to 4 seconds, is required at a pressure drop of more than 0.3 atmosphere absolute in the nozzle) propylene is supplied with intense mixing.

The propylene is either sucked into the nozzle or preferably fed in at superatmospheric pressure. The pressure ahead of the mixing nozzle is as a rule from 2 to 20, preferably 4 to 10, atmospheres absolute.

The propylene used for the reaction may be pure propylene or technical gas mixtures which in addition to at least 70% by volume of propylene may contain gases which are inert under the conditions of the reaction. If it should be necessary to separate a second organic phase in the event of the formation of such a phase, as further described below, it may even be advantageous to use propylene preferably containing 10 to 30% by volume of inert gas, the inert gas then serving for scrubbing out the byproducts.

As in the incorporation of the chlorine, the propylene is supplied while mixing intensely in mixing means having the necessary efficiency. In mixing nozzles of the abovementioned type and at pressure losses of at least 0.3 atmosphere absolute, preferably of from 0.5 to 1 atmosphere absolute, the mixing and reaction of the propylene with the solution loaded with chlorine take place so rapidly, for example within 0.01 second, that the residual chlorine in the reaction mixture after the following passage through the reaction zone with a residence time of not more than ten seconds, as a rule from 0.4 to 6 seconds, under the said temperature and pressure conditions, is practically completely reacted. The reaction zone is preferably a tube having a turbulent flow therein in which practically no backmixing takes place. It is particularly advantageous to use a bundle of tubes with turbulent flow which may serve at the same time as a cooler for wholly or partly removing the heat of reaction.

In the reaction according to the invention, so few byproducts form as a rule that they remain in solution and are discharged together with the product solution. If however by special choice of the reaction conditions more byproducts are formed than can be discharged in dissolved form with the product solution, these byproducts have to be removed from the recycled portion of the propylene chlorohydrin solution to such an extent that after fresh water, chlorine and propylene have been added the fresh formation of byproducts does not result in their solubility limit in the reaction solution being exceeded. Removal of these byproducts is carried out by a conventional method, for example by flash evaporation or preferably by stripping by means of an inert gas which is passed, upwardly countercurrent to the liquid reaction mixture trickling down, for example in a packed column.

The inert gas to be used for stripping may be supplied separately or together with the propylene. The latter procedure is possible in particular because in the process according to the invention (in contrast to the teaching of the prior art literature) it is not essential to avoid a gas phase in the propylene reaction. The use of inert gas, mainly propane, contained in technical propylene for stripping is therefore particularly advantageous.

At the outlet from the reaction zone, the reaction mixture is released from pressure, gasous constituents such as inert gas and excess olefin are removed and some of the product steam is recycled immediately or, as described above, if desired after separation of byproducts, the remainder is withdrawn as product solution at the rate at which the starting materials are fed in, and used for example for the manufacture of propylene oxide.

Fresh water has to be added to make up for the amount of chlorohydrin solution withdrawn. The ratio of fresh water to recycle solution is adjusted according to the pressure, temperature and concentration conditions chosen. As a rule a ratio of from 1:2 to 10:1, preferably from 1:1 to 6:1, of recycle solution to fresh water is chosen.

Individual embodiments of the process are illustrated in FIGS. 1 and 2 of the drawing.

In the reaction according to FIG. 1, fresh water (I) is introduced as a jet into a nozzle 1 mixed with gaseous and/or liquid chlorine (II). The mixture leaving nozzle 1 and generally containing (in addition to water practically saturated with chlorine) undissolved chlorine depending on the relative proportions of chlorine and water, the temperature and the pressure, is mixed in nozzle 2 with the recycled propylene chlorohydrin solution so that undissolved chlorine is completely dissolved. The gas-free solution laden with chlorine is supplied as a jet through nozzle 3 and mixed with the propylene (III). Immediately attached to the nozzle 3 is a turbulent flow tube 4 in which the rest of the reaction of the chlorine-laden solution with the propylene takes place under pressure. Downstream of tube 4 the reaction mixture is expanded through a pressure regulating valve 5 into a container 6 and degassed. The separated gas phase consists of inert constituents of the propylene and excess propylene and escapes at (IV). Some of the depressured propylene chlorohydrin solution is forced as product solution 7 into nozzle 2. Heat may be withdrawn from or supplied to the recycle solution by means of a heat exchanger 8 to maintain the desired reaction temperature. If desired the returning solution (VI) may be stripped with inert gas (VII) in a column 9. The offgas from the stripper 9 escapes with the offgas (IV).

The reactions in FIGS. 1 and 2 offer in that according to FIG. 1 the fresh water is first loaded with chlorine to form a mixture which may still be in two phases and is only then mixed with the recycle solution, whereas according to FIG. 2 the mixture of recycle solution and fresh water is mixed with chlorine. Reference numerals and letters have the same meaning in both Figures.

Propylene chlorohydrin concentrations of up to 10% by weight, high yields and very high space-time yields are achieved by the process according to the invention. Moreover it is not necessary in the new process to avoid the formation of a gas phase after the propylene has been added and to limit the propylene purity (as in the process of U.K. Pat. No. 1,024,819) to at least 95% by volume.

The following Examples illustrate the invention.

EXAMPLE 1

In an apparatus according to FIG. 1, 3.15 kg. per hour of chlorine gas is mixed with 80 liters per hour of river water in a liquid jet nozzle, the mixture is mixed with 320 liters per hour of recycle solution (propylene chlorohydrin concentration 5.0% by weight) and after a residence time of 1.5 seconds at 40° C. mixed with 1.89 kg. per hour of propylene, calculated as 100% (composition: 96% by volume of propylene, 4% by volume of inert substances) at a reaction pressure of 3 atmospheres gauge in a liquid jet nozzle. The residence time in the attached reaction tube is four seconds. 84 kg. per hour of reaction mixture is withdrawn and the remainder is recycled without removing byproducts. The yield is 4.2 kg. per hour of propylene chlorohydrin (calculated as 100%) as a 5% solution, i.e. 98.0% of the theory based on the chlorine used. The spacetime yield is 5.8 kg. per liter per hour of propylene chlorohydrin based on the reaction volume.

Mixing of both the chlorine and the propylene is carried out in each case in a liquid jet nozzle with a nozzle outlet velocity of the jet of 17 meters per second and a mixing chamber whose diameter is five times the diameter of the nozzle outlet and whose length is eight times its diameter. The pressure drop due to acceleration of the liquid is 1.45 atmospheres absolute.

EXAMPLES 2 TO 7

These Examples given in the following Table are carried out in the same way according to one of the variants of FIGS. 1 and 2.

| Example | 2 | 3 | 4 | 5 | 6 | 7 |
|---|---|---|---|---|---|---|
| Chlorine kg./h | 5.63 | 5.63 | 3.86 | 6.8 | 4.36 | 6.4 |
| Fresh water l./h | 133 | 133 | 57 | 100 | 100 | 160 |
| Recycle solution l./h | 266 | 266 | 343 | 300 | 300 | 240 |
| Propylene kg./h. (calculated 100%) | 3.3 | 3.3 | 2.2 | 4.0 | 2.57 | 3.8 |
| Reaction temperature, °C | 40 | 40 | 40 | 40 | 30 | 30 |
| Reaction pressure (atmospheres gauge) | 3 | 3 | 3 | 5 | 2 | 3 |
| Percent by weight of chlorohydrin in the solution | 5.0 | 5.0 | 8.0 | 8.0 | 5.2 | 4.7 |
| Separation of byproducts (stripping) | − | + | + | + | − | + |
| Yield (percent of theory) based on chlorine used | 94 | 95 | 97 | 97 | 95 | 94 |
| Ratio recycle/fresh water | 2:1 | 2:1 | 6:1 | 3:1 | 3:1 | 1.5:1 |
| Space time yield kg./l./h | 9.7 | 9.9 | 6.9 | 12.1 | 7.6 | 11.1 |

The characteristic geometrical data of the nozzles, the nozzle outlet velocity of the liquid jet, the pressure drop due to acceleration, and the residence time of the chlorine solution after the addition of propylene have the same values in Examples 2 to 7 as in Example 1.

Similar results are achieved when the nozzle outlet velocity is 10 meters per second or 30 meters per second.

We claim:

1. In a process for the continuous production of an aqueous solution of propylene chlorohydrin by reacting propylene with an aqueous chlorine solution, recycling some of the reaction solution and adding make-up water, the improvement which comprises loading the recycled solution with chlorine to such an extent that the limit of solubility of the chlorine is not exceeded, by means of a two fluid nozzle, metering the propylene to be reacted into the chlorine-laden solution at a pressure of from 2 to 20 atmospheres absolute and at a temperature of from 10° to 80° C., by means of a two fluid nozzle, allowing the reaction mixture to react in one or more parallel tubes with turbulent flow in the same pressure range with a residence time of not more than ten seconds, releasing the pressure, withdrawing some of the propylene chlorohydrin solution as product and recycling the remainder of the propylene chlorohydrin solution, wherein at the point of incorporation of the chlorine as well as at the point of incorporation of propylene the recycle liquid is introduced at a velocity of from 2 to 100 meters per second through said two-fluid nozzles and then into a mixing zone extending in the direction of flow whose diameter is from 1.5 to 50 times the mean outlet diameter of the liquid nozzles and whose length is from 3 to 30 times its hydraulic diameter, and allowing the mixture to complete the reaction in one or more parallel reaction tubes.

2. A process as set forth in claim 10 wherein the propylene to be reacted is metered in at a pressure of 4 to 10 atmospheres absolute and at a temperature of 20° to 50° C.

3. A process as set forth in claim 10 wherein the velocity at which the liquid is introduced is from 10 to 30 meters per second.

4. A process as set forth in claim 1 wherein clorine in gaseous form is added to the recycled reaction solution.

5. A process as set forth in claim 1 wherein chlorine in liquid form is added to the recycled reaction solution.

6. A process as set forth in claim 1 wherein chlorine in gaseous form is added to a mixture of makeup water and the recycled reaction solution.

7. A process as set forth in claim 1 wherein chlorine in liquid form is added to a mixture of makeup water and the recycled reaction solution.

8. A process as in claim 1 for the continuous production of an aqueous solution of propylene chlorohydrin by reacting propylene with an aqueous chlorine solution and recycling some of the reaction solution, the improvement which comprises loading the recycled solution with chlorine which is added to the said solution directly or to the make-up water which is thereafter added to said recycled solution to such an extent that the limit of solubility of the chlorine is not exceeded, by means of a two fluid nozzle, metering the propylene to be reacted into the chlorine-laden solution at a pressure of from 2 to 20 atmospheres absolute and at a temperature of from 10° to 80° C., by means of a two fluid nozzle, allowing the reaction mixture to react in one or more parallel tubes with turbulent flow in the same pressure range with a residence time of not more than ten seconds, releasing the pressure, withdrawing some of the propylene chlorohydrin solution as product and recycling the remainder of the propylene chlorohydrin solution, wherein at the point of incorporation of the chlorine as well as at the point of incorporation of propylene the recycle liquid is introduced at a velocity of from 2 to 100 meters per second through said two-fluid nozzles in which the component to be admixed is introduced in the shear gradient between the rapidly flowing jet and a more slowly flowing portion of the liquid and then into a mixing zone extending in the direction of flow whose diameter is from 1.5 to 50 times the mean outlet diameter of the liquid nozzles and whose length is from 3 to 30 times its hydraulic diameter which is defined by the formula $$d = 4\frac{F}{u}$$

wherein F is the flow cross-section and $u$ is the wetted circumference of the pipe, and allowing the mixture to complete the reaction in one or more parallel tubes.

9. A process as set forth in claim 8 wherein chlorine in gaseous form is added to the makeup water.

10. A process as set forth in claim 8 wherein chlorine in liquid form is added to the makeup water.

References Cited

UNITED STATES PATENTS

| 3,277,189 | 10/1966 | Bromberg | 260—634 |
| 3,285,976 | 11/1966 | Wegner et al. | 260—634 |
| 2,902,519 | 9/1959 | Cosby et al. | 260—634 |
| 2,102,042 | 12/1937 | Spence | 260—634 |
| 2,714,123 | 7/1955 | Johnson | 260—633 |
| 2,130,226 | 9/1938 | Britton et al. | 260—634 |
| 2,714,121 | 7/1955 | Anderson et al. | 260—634 |
| 2,714,122 | 7/1955 | Smith et al. | 260—133 |

FOREIGN PATENTS

| 7,457 | 7/1962 | Japan | 260—634 |
| 1,943,331 | 3/1970 | Germany | 260—634 |

HOWARD T. MARS, Primary Examiner

UNITED STATES PATENT OFFICE
CERTIFICATE OF CORRECTION

PATENT NO. : 3,845,144
DATED : October 29, 1974
INVENTOR(S) : BARTHOLOME et al

It is certified that error appears in the above-identified patent and that said Letters Patent are hereby corrected as shown below:

In Column 1, in the heading, insert --Claims Priority, Application Germany, May 11, 1970, P 20 22 819.7--

Signed and Sealed this

Twenty-first Day of September 1976

[SEAL]

Attest:

RUTH C. MASON
Attesting Officer

C. MARSHALL DANN
Commissioner of Patents and Trademarks